United States Patent [19]
Amir et al.

[11] Patent Number: 5,383,016
[45] Date of Patent: Jan. 17, 1995

[54] METHOD FOR ALIGNING TWO REFLECTIVE SURFACES

[75] Inventors: Israel Amir, Princeton; Ralph A. Treder, Ewing, both of N.J.

[73] Assignee: AT&T Corp., Murray Hill, N.J.

[21] Appl. No.: 91,711

[22] Filed: Jul. 15, 1993

[51] Int. Cl.⁶ .................................... G01B 11/26
[52] U.S. Cl. .................... 356/150; 356/138; 356/152.2; 250/561
[58] Field of Search .............. 356/152, 400, 399, 150, 356/138; 250/561

[56] References Cited

U.S. PATENT DOCUMENTS

| | | | |
|---|---|---|---|
| 4,774,405 | 9/1988 | Malin | 250/225 |
| 5,042,945 | 8/1991 | Shibata et al. | 356/152 |

*Primary Examiner*—F. L. Evans
*Assistant Examiner*—Jason D. Eisenberg
*Attorney, Agent, or Firm*—Robert B. Levy

[57] ABSTRACT

First and second plates (10 and 12), each having a reflective surface (14) opposite the reflective surface on the other plate, are aligned substantially parallel to each other by first separating the second plate (12) from the first one. A beam of collimated light (24) is then directed at the first plate (10) so the beam is reflected along a path lying in the field of view of a light detector (26). The second plate (12) is then positioned relative to the first plate (10) so that the beam (24) is reflected from the second plate onto the first plate for reflection therefrom onto the second plate so as to undergo at least one reverberation before being reflected from the second plate into the light detector so as to appear at substantially the same point before the plates were separated.

3 Claims, 1 Drawing Sheet

METHOD FOR ALIGNING TWO REFLECTIVE SURFACES

TECHNICAL FIELD

This invention relates to a method for aligning two spaced-apart, reflective surfaces to obtain true parallelism between them (within a prescribed tolerance factor).

BACKGROUND OF THE INVENTION

In certain manufacturing processes, there is a need to align two surfaces so that they are truly parallel to each other (within a prescribed tolerance factor). For example, when placing a very delicate planar object, such as a semiconductor chip, onto a planar substrate, such as a silicon or diamond mount, it is important that the chip be substantially parallel to the mounting substrate during placement. If the chip is not maintained parallel to the mounting substrate during placement, the chip may crack or otherwise become damaged when brought into contact with the substrate.

In the past, alignment of two surfaces has been accomplished with the aid of a laser interferometer. While the laser interferometer is capable of detecting the degree of parallelism of two surfaces quite accurately, the laser interferometer is nevertheless costly and complex to operate. Moreover, as its name implies, the laser interferometer contains a laser whose use is subject to many safety precautions. Consequently, such laser interferometers cannot always be readily employed in a factory environment to make on-line parallelism measurements during the alignment of two surfaces.

Thus, there is a need for a technique for aligning two surfaces to achieve substantially true parallelism therebetween without the need for a laser interferometer.

SUMMARY OF THE INVENTION

Briefly, in accordance with a preferred embodiment of the invention, there is disclosed a method of aligning two light-reflecting surfaces to obtain substantially true parallelism therebetween. The method is initiated by temporarily separating the first surface from the second surface. Thereafter, a beam of collimated light is directed at the second surface at an acute angle for reflection along a first path. A light detector, such as a television camera, for example, is positioned so that the beam of collimated light reflected along the first path lies within the field of view of the light detector. After performing this setup operation, the first surface is positioned proximate to, but spaced from, the second surface so that the beam striking the second surface is reflected onto the first surface. In turn, the beam is reflected from the first surface back onto the second surface to cause the beam to be reflected back and forth (i.e., "reverberate") between the first and second surfaces at least once before the beam is ultimately reflected from the second surface into the light detector. The first surface is positioned such that the reflected beam, which has reverberated at least once, is reflected from the second surface into the light detector so as to appear the same as if the beam were reflected by the second surface alone (i.e., no reverberations).

DETAILED DESCRIPTION

Figure 1:
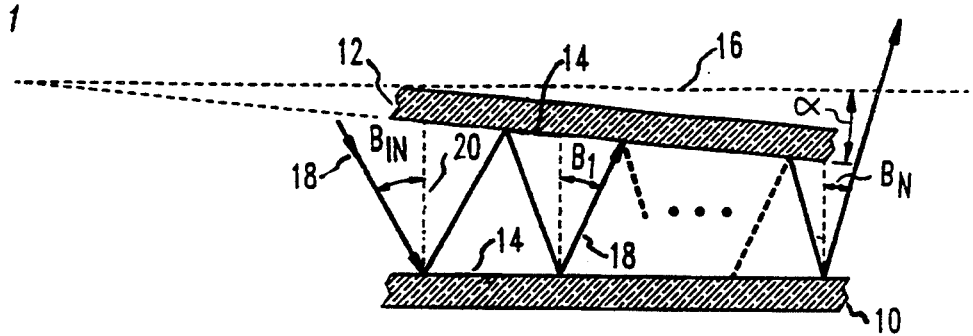
FIG. 1 is a side view, in cross section, of two light reflective plates which are to be aligned in accordance with the method of invention.

Before proceeding to describe the method of the invention for aligning a pair of plates to achieve substantially true parallelism between them (within a prescribed tolerance factor), a brief discussion of the principle underlying the invention will be provided first. Referring to FIG. 1, there is shown lower and upper plates 10 and 12, respectively, which are nominally parallel to each other. Each plate of the plates 10 and 12 has a reflective major surface 14 opposite to the reflective major surface on the other plate. Although the plates 10 and 12 are nominally parallel to each other, the upper plate 12 actually has one of its ends (e.g., its right hand end as seen in FIG. 1) spaced somewhat closer to the plate 10 than its left hand end. As a consequence, the plate 12 appears tilted by a small angle $\alpha$ below a plane 16 (shown by a dashed line) parallel with the lower plate 10.

Now, consider the effect of directing a collimated beam of light (shown by a single ray 18) at the surface 14 on the lower plate 10 so that the ray makes an acute angle $\beta_{in}$ in with a line 20 normal to the plate surface. Since the surface 14 on the plate 10 is reflective, the ray 18 is reflected from this surface towards the plate 12 at an angle equal to the angle of incidence $\beta_{in}$ by virtue of Snell's Law. The ray 18 reflected from the plate 10 strikes the surface 14 on the plate 12 and is reflected therefrom back onto the surface 14 of the plate 10. The ray 18 is again reflected from the plate 10 onto the surface 14 of the plate 12 and so on.

Each time the ray 18 is reflected from the plate 10 to the plate 12 and back onto the plate 10, the ray is said to undergo a "reverberation." After a first reverberation, the ray 18 is reflected from the plate 10 at an angle $\beta_1$ with a line parallel to the surface normal 20. Under the condition where the plate 12 is offset from the plate 10 by the angle $\alpha$, the angle $\beta_1$ can be derived from the incident angle $\beta_{in}$ by the relationship:

$$\beta_1 = \beta_{in} - 2\alpha \tag{1}$$

After each reverberation of the ray 18, the angle made by the ray upon reflection from the surface 14 of the plate 10 is diminished from the original angle of incidence $\beta_{in}$ by an amount equal to twice the angular offset $\alpha$. Thus, for N reverberations (where N is an integer), the angle $\beta_N$ made by the ray 18 with the plate 10 will be given by $$\beta_N = \beta_{in} - 2\alpha N \tag{2}$$

As may be appreciated, the angular difference between $\beta_N$ and $\beta_{in}$ after N reverberations is "amplified" by the offset angle $\alpha$. This "amplification" phenomenon can be utilized, as will be discussed hereinafter with respect to FIG. 2, in aligning the plates 10 and 12 so as to achieve a very high degree of parallelism between them.

Figure 2:
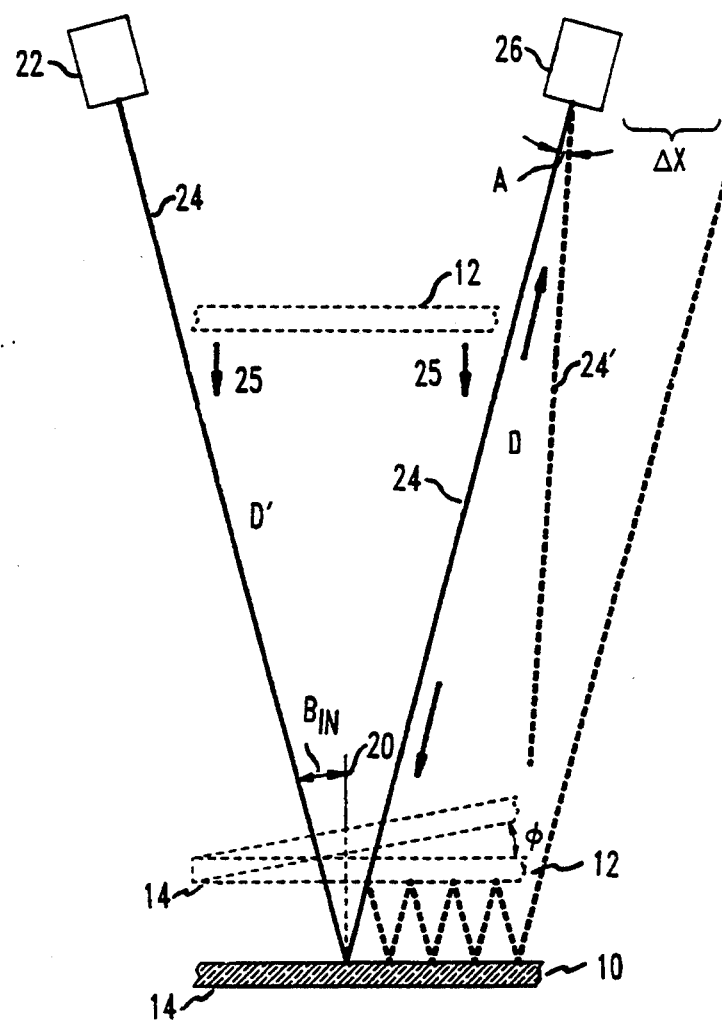
FIG. 2 shows an apparatus, in accordance with the invention, for detecting when the two plates of FIG. 1 have been aligned nearly parallel with each other.

Referring to FIG. 2, accurate alignment of the plates 10 and 12 is carried out using a light source 22 that produces a beam of collimated light (depicted as a single ray 24) and a light detector 26, typically a television camera, photocell or other type of electrical device capable of generating an electrical signal in response to the receipt of light directed into its field of view. Note that a manual light detector, i.e., an eyepiece (not shown), could also be employed. In the setup shown in FIG. 2, the light source 22 is positioned a distance D' away from the plate 10 so that the ray 24 strikes the plate surface 14 at an angle $\beta_{in}$ with the surface normal 20 where $\beta_{in} < 90°$.

The plate 12 is then temporarily removed or is at least separated from the plate 10 a sufficient distance in a direction opposite to the direction indicated by arrows 25 such that the ray 24 strikes the surface 14 of the lower plate 10 and is reflected therefrom without striking the plate 12. In other words, the ray 24 undergoes no reverberations. With the upper plate 12 temporarily displaced from the lower plate 10, the light detector 26 is positioned such that the ray 24 lies within its field of view, allowing the detector to sense the intensity of the reflected ray.

The ray 24 reflected from the surface 14 on the lower plate 10 passes through an aperture A associated with the light detector 26 prior to being received on a photosensitive element (not shown) within the detector. The aperture A is adjustable and is typically set as small as possible, but not so small as to diminish the intensity of the ray 24 received by the light detector 26 photosensitive element. Although not shown, a lens (not shown) may be provided to focus the light ray reflected from the plate 10 onto the aperture A.

The fact that the aperture A associated with the light detector has a finite diameter allows the light detector 26 to be positioned with its optical axis slightly misaligned with the reflected ray 24 and yet still capture the ray. As a result, there is a certain angle insensitivity (error) associated with the light detector 26 which may be approximated by the relationship $$\phi' \simeq \frac{A}{2D} \quad (3)$$

where A is the aperture diameter and D is the distance of the light detector 26 from the plate 10. The angle error will be greatest when the aperture A is open to its largest value while the error will be smallest when the aperture A is closed to its smallest value. If the distance D is 10 inches and the largest and smallest aperture openings are 500 mils and 5 mils, respectively, then the worst case and best case angle error values will be 1.43° and 0.014°, respectively, After perforating the above-described setup procedure, the upper plate 12 is positioned proximate the lower plate 10 so that ray 24 undergoes a single reverberation. In other words, N=1. At this time, the aperture A is initially opened to its maximum value to allow for maximum intensity. The aperture A is then be made smaller to reduce the angle insensitivity until the intensity of the light received by the light detector 26 begins to diminish.

By positioning the top plate 12 such that the ray 24 undergoes a single reverberation before being reflected from the lower plate 10 into the light detector 26, the top plate can be aligned substantially parallel with the lower one. As may be appreciated when the two plates 10 and 12 are truly parallel, the angle $\beta_N$ at which the ray 24 is reflected from the plate 10 will equal the incidence angle $\beta_{in}$. In other words, $\alpha$ is zero and the amplification factor of $2\alpha N$ is likewise zero.

However, under these conditions, the ray 24 reflected from the bottom plate 10 after one reverberation will be parallel to the incident ray 24 but offset therefrom by an amount $\Delta x$. Depending on the degree of the offset, and the field of view of the light detector 26, the reflected ray 24 may be displaced laterally such a distance so as to not enter the light detector.

To overcome this problem, the plate 12 is not aligned with the plate 10 so as to be absolutely parallel therewith. Rather, the plate 12 is tilted by a small angle $\phi$ from an orientation at which it would be truly parallel with the plate 10. Under these conditions, the plate 10 will reflect a ray 24' into the light detector 26, the ray shown by a dashed line. While this approach to aligning the plates 10 and 12 introduces a certain degree of error, the magnitude of the error is very small, especially when the ray 24 undergoes a number reverberations. The magnitude of $\phi$, the error angle is given by the relationship $$\phi' = \frac{L\cos(\beta_{in})}{2ND} \quad (4)$$

where L is the length of the plates 10 and 12, $\beta_{in}$ is the incident angle, D the distance of the light detector 26 from the plate 10 and N, the number of reverberations. As an example, when L is 75 mils, N is 10, $\beta_{in}$ is 45° and D is 10 inches, the angle error $\phi$ will be approximately 0.015°. By positioning the plate 12 relative to the plate 10 to increase the number of reverberations, the accuracy of the alignment (i.e., the greater the degree of parallelism between the two plates) may be increased.

To further increase the accuracy of alignment achieved by the above-described technique, the light detector 26 may be shifted laterally to compensate for the offset of the reflected beam when the plates 10 and 12 become nearly parallel to each other. As a consequence, the maximum error $\phi'$ will now be given by:

$$\phi' = \frac{A_{min}}{2ND} \quad (5)$$

Assuming that N is 10, D is 10 inches and $A_{min}$ is 10 mils, then the maximum error angle is 0.0028°.

Although the alignment technique of the invention has been described in terms of displacing the upper plate 12, there may situations where only the lower plate 10 may be capable of being displaced. If only the bottom plate 10 is capable of being displaced, then it is necessary to adjust the position of the light source 22 and light detector 26 following removal of the top plate to assure that $\beta_{in}$ equals $\beta_{out}$. The lower plate 10 is then positioned to obtain maximum light sensitivity at the light detector 26. The process of readjusting the light source 22 and the light detector 26 in the absence of the upper plate 12 and then adjusting the position of the lower plate 10 is repeated until the process converges (usually within 2-3 iterations).

Note that with the above-described alignment technique, them is no need to repeat the steps of the process to address the possibility of misalignment in a direction normal to the plane of FIGS. 1 and 2. Any misalignment in a direction orthogonal to the plane of FIGS. 1 and 2 will be corrected during the step-up condition when the light source 22 and the light detector 26 are positioned such that $\beta_{in}$ equals $\beta_{out}$.

The foregoing describes a technique aligning two light-reflective plates 10 and 12 so as to achieve substantially true parallelism therebetween.

It is to be understood that the above-described embodiments are merely illustrative of the principles of the invention. Various modifications and changes may be made thereto by those skilled in the art which will embody the principles of the invention and fall within the spirit and scope thereof.

We claim:

1. A method for aligning a first and a second light-reflecting surface to obtain substantial parallelism between the light-reflecting surfaces, comprising the steps of:

temporarily separating the first surface from the second surface;

directing a collimated beam at the second surface at an acute angle so that the beam is reflected from said surface along a first path;

positioning a light detector so that the collimated beam, upon reflection along the first path, lies in the field of view of the light detector; and positioning the first surface relative to the second surface so that the collimated beam reflected by the second surface strikes the first surface and is reflected therefrom back onto the second surface reflection by the second surface into the light detector so as to appear at the same position as the beam reflected by the second surface when the first surface was temporarily separated from the second surface.

2. The method according to claim 1 wherein the first surface is positioned so the beam is reflected from the second surface onto the first surface for reflection back onto the second surface so as to be reflected therefrom back onto the first surface such that the beam is reflected back and forth between the first and second surfaces a plurality of times before being reflected from the second surface into the light detector.

3. The method according to claim 1 further including the step of displacing the light detector laterally from the position at which it received the beam reflected from the second surface when the first surface was temporarily separated therefrom so that when the first surface is positioned proximate the second surface, the beam reflected from the second surface strikes onto the first surface and is reflected therefrom back onto the second surface for reflection therefrom into the light detector along a path substantially parallel to the first path.

* * * * *